June 30, 1931.  J. T. McINTOSH  1,812,661
VEHICLE SPRING SUSPENSION
Filed Dec. 15, 1928

Inventor:
John T. McIntosh,
By
Attys.

Patented June 30, 1931

1,812,661

UNITED STATES PATENT OFFICE

JOHN T. McINTOSH, OF CHICAGO, ILLINOIS

VEHICLE SPRING SUSPENSION

Application filed December 15, 1928. Serial No. 326,167.

This invention which relates to a vehicle spring suspension is concerned particularly with the association of a main multiple leaf supporting spring and a supplemental co-acting spring, and with certain mountings therefor by which the action of the supplemental spring is specially controlled.

A suggestive embodiment of my invention is set forth in the accompanying drawings wherein—

Figure 1:
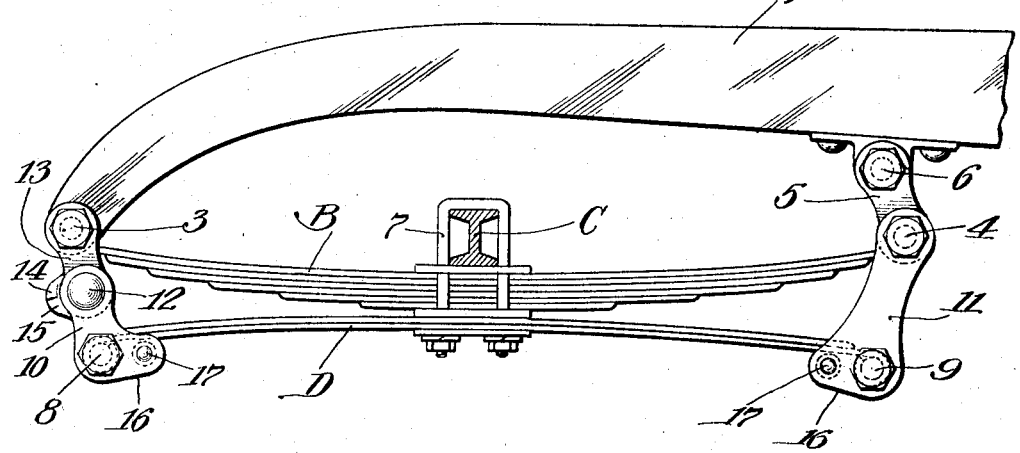
Figure 2:
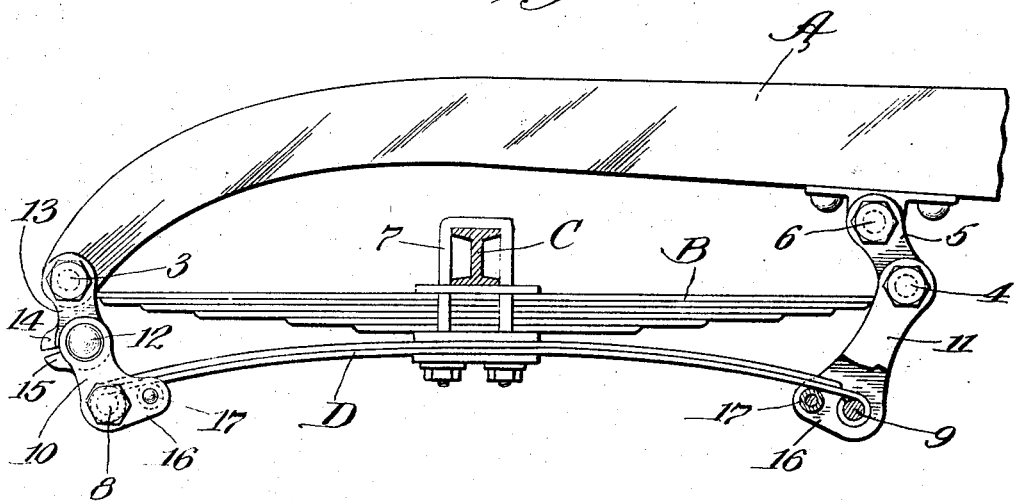

Figure 1 is a side elevation of one end of a vehicle frame member having the present spring suspension; and Fig. 2, which is a similar view, shows the same parts as they appear when the main spring is under compression.

A longitudinal frame member A of a vehicle is shown in the drawings as downturned at one end to receive therethrough a bolt or pin 3 forming a pivotal mounting for one end of a multiple leaf spring B the opposite end of which is joined to a second bolt or pin 4 forming a pivotal connection therefor at one end of a shackle 5 which depends from a bolt or pin 6 having a bracketed mounting on the frame member A.

The main spring which is normally bowed downwardly, as shown is connected intermediately of its ends with one of the vehicle axles C in any conventional manner, as, for example, by U-bolts 7. The same U-bolts may be utilized for connecting to this main spring a supplemental leaf spring D, the two ends of which are joined to bolts or pins 8 and 9 which are carried at the lower ends of shackles 10 and 11. The shackle 10 is joined by a pivotal connection 12 to a shackle 13 which is supported on the pivot 3 and the shackle 11 is swingingly supported on the pivot 4 at the lower end of the shackle 5. The two springs which are joined together near their centers by the U-bolt 7 are held thereby against relative longitudinal movement.

The shackle 13, which is joined to the frame member A close to its extremity, is provided with a shoulder 14 adapted to abut a second shoulder 15 extended from the associated shackle 10 when the parts are subjected to normal load, as indicated in Fig. 1. In such cases, the centers of the pivots 3, 12 and 8 are substantially in alignment. Swinging movement of the lower shackle 10 may accordingly take place in one direction only, as indicated in Fig. 2.

Each of the two lower shackles 10 and 11 in its lower portion is laterally extended towards the other as at 16 to provide mountings for roller pins 17 which underlie the supplemental spring at an appreciable distance from the ends thereof which are joined to the pivots 8 and 9. These roller pins, by preference, are slightly spaced from the supplemental springs when the parts are subjected to normal load, as in Fig. 1.

The behavior of the spring suspension just described is substantially as follows: When the main spring is compressed, due to a shock transmitted from the road, it is straightened, the distance between its two ends, viz., the pivots 3 and 4 being thereby increased. Inasmuch as the pivot 3 is fixed, the pivot 4 alone is shifted lengthwise of the frame member A, this being accompanied by a swinging movement of the shackle 5.

The supplemental spring during this movement of the parts is arched to an appreciable extent, thus shortening its length. The consequence of these movements is that the two pivots 8 and 9 are brought closer together by an inward swinging movement of the two shackles 10 and 11. This arching of the supplemental spring is accompanied by an increase in its tension, and in addition the movements of the shackles 10 and 11 cause the roller pins 16 and 17 to be raised to a point where they engage with the supplemental spring in a manner to enhance the arching thereof irrespective of any natural deflection which takes place. At the moment that the main spring is ready to expand, following exhaustion of a road shock, the supplemental spring is under increased tension to oppose the rebound thereof, and the end supports for the supplemental spring are moved inwardly from the pivots 8 and 9 to the points of engagement with the roller pins 16. The expansion of the main spring will accordingly be opposed initially by the supplemental spring when in its most effective condition for this purpose, so that momentum will be checked at the start.

It will be apparent that the principle underlying this invention may be variously embodied, so as to meet individual requirements, but in all such cases, the feature of shortening the end supports of the supplemental spring will persist so as to enhance its checking function when the main spring is about to undergo expansion.

I claim:

1. A suspension for attachment to the longitudinal frame member of a vehicle, comprising a main leaf spring supporting an axle of the vehicle, mountings for the spring ends, a supplemental leaf spring operatively associated with the first spring and connected thereto intermediate its ends, mountings for the supplemental spring, and coacting stop members on adjacent mountings of both springs.

2. A suspension for attachment to the longitudinal frame member of the vehicle, comprising a main leaf spring supporting an axle of the vehicle, mountings for the ends thereof, a supplemental spring associated with the first spring intermediate its ends, shackles for the supplemental spring pivoted to the mountings, said supplemental spring hinged to the shackles, the latter having means adjacent the hinged connection of the supplemental spring thereto to aid in the tensioning of the supplemental spring in one of its operative positions, and coacting stop members for both springs.

In testimony whereof, I have hereunto set my hand at Chicago, Illinois, this 7th day of December, 1928.

JOHN T. McINTOSH.